US012049017B2

(12) United States Patent
Atwood et al.

(10) Patent No.: US 12,049,017 B2
(45) Date of Patent: Jul. 30, 2024

(54) FOOD SLICER

(71) Applicants: Michael Curtis Howard Atwood, Medicine Hat (CA); David Bertram Gunderson, Medicine Hat (CA)

(72) Inventors: Michael Curtis Howard Atwood, Medicine Hat (CA); David Bertram Gunderson, Medicine Hat (CA)

( * ) Notice: Subject to any disclaimer, the term of this patent is extended or adjusted under 35 U.S.C. 154(b) by 245 days.

(21) Appl. No.: 17/545,495

(22) Filed: Dec. 8, 2021

(65) Prior Publication Data

US 2023/0173701 A1 Jun. 8, 2023

(51) Int. Cl.

*B26B 25/00* (2006.01)
*B26B 5/00* (2006.01)
*B26B 9/02* (2006.01)
*B26B 29/02* (2006.01)

(52) U.S. Cl.

CPC ............ *B26B 25/005* (2013.01); *B26B 5/008* (2013.01); *B26B 9/02* (2013.01); *B26B 29/02* (2013.01)

(58) Field of Classification Search

CPC ......... B26B 25/005; B26B 5/008; B26B 9/02; B26B 29/02
USPC .............................................................. 83/42
See application file for complete search history.

(56) References Cited

U.S. PATENT DOCUMENTS 2,493,244 A 1/1950 Gustafson
3,724,071 A * 4/1973 Hurtubise ................. C14B 5/00 30/304
4,779,344 A * 10/1988 Panisch .................. A47G 21/02 30/326
5,655,303 A * 8/1997 Janczak ................. A47G 21/02 30/326
6,105,254 A * 8/2000 Crane .................... A47G 21/04 30/326
D511,075 S * 11/2005 Christ ............................ D7/694
7,204,023 B2 * 4/2007 Chang ................... B26B 25/005 30/162
8,667,696 B2 * 3/2014 Zdroik .................. B26B 25/005 30/306
D780,538 S * 3/2017 Arobas .......................... D7/694
9,895,818 B2 * 2/2018 Wong .................... B26B 25/005
10,959,554 B2 * 3/2021 Malcolm ................ A47G 21/04
11,324,345 B2 * 5/2022 Oehlert .................. A47G 21/04
(Continued)

FOREIGN PATENT DOCUMENTS

CA 2587389 C 1/2008
CA 2656592 A1 1/2008
(Continued)

*Primary Examiner* — Omar Flores Sanchez
(74) *Attorney, Agent, or Firm* — Argus Intellectual Enterprise, LLC; Jordan Sworen; Daniel Enea

(57) ABSTRACT

A food slicer, which may be used for cutting a pizza with a single blade, and other food, such as pancakes, with multiple blades includes a housing configured to be gripped by a user in a first tilted orientation in which only the first rotating blade touches a work surface, and in a second level orientation, in which all three blades touch the work surface. A first rotating blade is mounted in the housing offset along a longitudinal axis from second and third rotating blades, whereby the tripod arrangement enables a steady structure during non-use, and whereby the second and third rotating blades may be lifted off of the working surface, while the first rotating blade cuts the pizza.

17 Claims, 16 Drawing Sheets

(56) References Cited

U.S. PATENT DOCUMENTS

| | | | | |
|---|---|---|---|---|
| 2001/0029671 | A1 | 10/2001 | Young et al. | |
| 2003/0233753 | A1* | 12/2003 | Sala | A47G 21/02 30/142 |
| 2004/0200076 | A1* | 10/2004 | Tranfaglia | A47G 21/02 30/322 |
| 2005/0034311 | A1* | 2/2005 | Crane | A47G 21/02 30/324 |
| 2006/0090345 | A1* | 5/2006 | Stravitz | B26B 25/005 30/50 |
| 2007/0294898 | A1* | 12/2007 | Beltran | B26B 5/008 30/307 |
| 2008/0282551 | A1* | 11/2008 | Stravitz | B26B 29/02 30/296.1 |
| 2012/0096719 | A1* | 4/2012 | Zdroik | B26B 25/005 30/304 |
| 2016/0000247 | A1* | 1/2016 | Vogele | A47G 21/02 30/142 |
| 2018/0126575 | A1* | 5/2018 | Goins | B26B 25/005 |
| 2019/0329264 | A1* | 10/2019 | Krus | B02C 18/182 |
| 2023/0173701 | A1* | 6/2023 | Atwood | B26B 29/02 83/42 |
| 2023/0233009 | A1* | 7/2023 | Pogan | A47G 21/04 30/324 |

FOREIGN PATENT DOCUMENTS

| | | | | |
|---|---|---|---|---|
| DE | 3733049 | A1 | 4/1989 | |
| GB | 2056359 | A * | 3/1981 | A21C 11/106 |

* cited by examiner

FOOD SLICER

BACKGROUND

Conventional pizza cutters include a single rotating cutting blade with an elongated handle. Unfortunately, using a conventional pizza cutter for slicing other types of food, such as pancakes, becomes an arduous task resulting in unevenly sized pieces. Multi-blade cutters enable food to be sliced and diced, but do not provide the control and accuracy of a single blade cutter. Moreover, current multi-blade cutters are cumbersome and take up a lot of room during storage.

An object of the present disclosure is to provide a food slicer, which may be used for cutting both pizzas with a single blade and other food, such as pancakes, with multiple blades. Another object of the present disclosure is to provide a food slicer, which may be easier to use and store during non-use.

BRIEF SUMMARY

The present disclosure relates to a food slicer comprising: a housing configured to be gripped by a user, the housing having a longitudinal axis; a first rotating blade rotatably extending from the housing about a first axis perpendicular to the longitudinal axis; a second rotating blade rotatably extending from the housing about a second axis perpendicular to the longitudinal axis and offset along the longitudinal axis to the first axis; and a third rotating blade rotatably extending from the housing about a third axis perpendicular to the longitudinal axis and offset along the longitudinal axis from the first axis;

Accordingly, in a first tilted arrangement only the first rotating blade touches a work surface, and in a second level arrangement the first rotating blade, the second rotating blade and the third rotating blade touch the work surface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
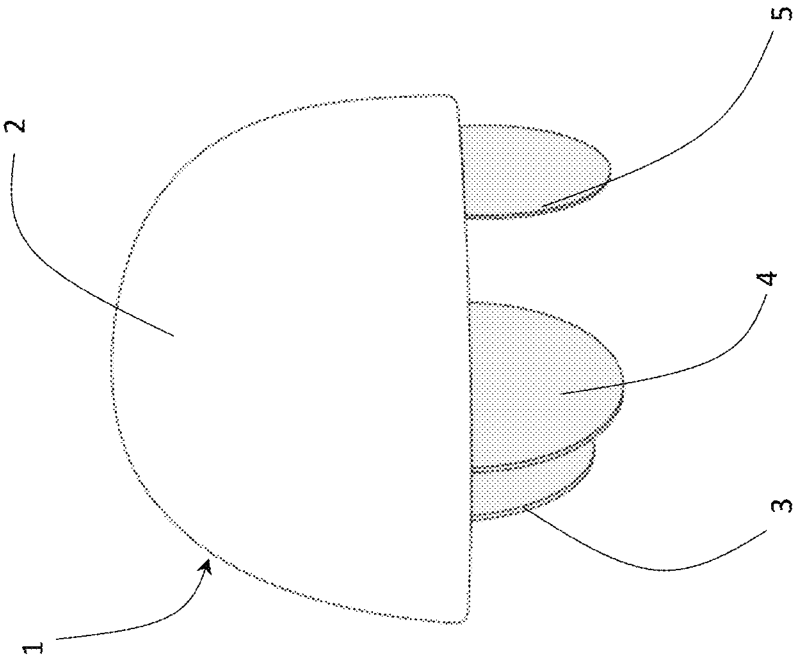
FIG. 1A illustrates an isometric view of an exemplary embodiment of a food slicer.

A food slicer 1, in accordance with the present disclosure, includes a housing 2 configured to cover a top portion of a plurality of round rotating cutting blades to provide a guard or shroud therefore. The plurality of round rotating cutting blades may comprise at least three round rotating cutting blades, e.g. a first cutting blade 3, a second cutting blade 4 and a third cutting blade 5. Ideally, the housing 2 covers half of the first, second and third cutting blades 3, 4 and 5, whereby substantially half of the first, second and third cutting blades 3, 4 and 5 are exposed. The first cutting blade 3 may be positioned along a longitudinal axis 6 of the housing 2, while the second cutting blade 4 and the third cutting blade may be laterally offset from the longitudinal axis 6, e.g. on opposite sides of the longitudinal axis 6. The second cutting blade 4 and the third cutting blade 5 may be laterally offset from the first cutting blade 3 by at least 0.75 inches, preferably at least 1 inch, and more preferably between 1 inch and 1.5 inches. Of course, any lateral offset is within the scope of the invention, based on the width of the slices required. One or more of the first, second and third cutting blades 3, 4 and 5 may include a shaped cutting edge, e.g. corrugated or zig-zag.

The three cutting blades 3, 4 and 5 may be in a tripod arrangement with second and third cutting blades 4 and 5 positioned slightly behind the first cutting blade 3, offering additional cutting capability while also offering support to the first cutting blade 3. The tripod setup also allows for the food slicer 1 to stand on its own without needing to be placed on its side while not in use. The food slicer 1 may come with a base 8 (FIG. 1B) that the body of the food slicer 1 will fit into like a lid over a dish for easy storage and to reduce risk of injury or mess on the table. The food slicer 1 and the lid may be washed separately and may be dishwasher safe.

The second cutting blade 4 and the third cutting blade 5 may also be offset along the longitudinal axis, whereby the second cutting blade 4 and the third cutting blade 5 are positioned to the rear (or forward) of first cutting blade 3. The second cutting blade 4 and the third cutting blade 5 may be offset along the longitudinal axis by at least 0.5 inches, preferably by at least 1 inch, and more preferably between 1 inch and 2 inches.

Figures 8A, 8B:
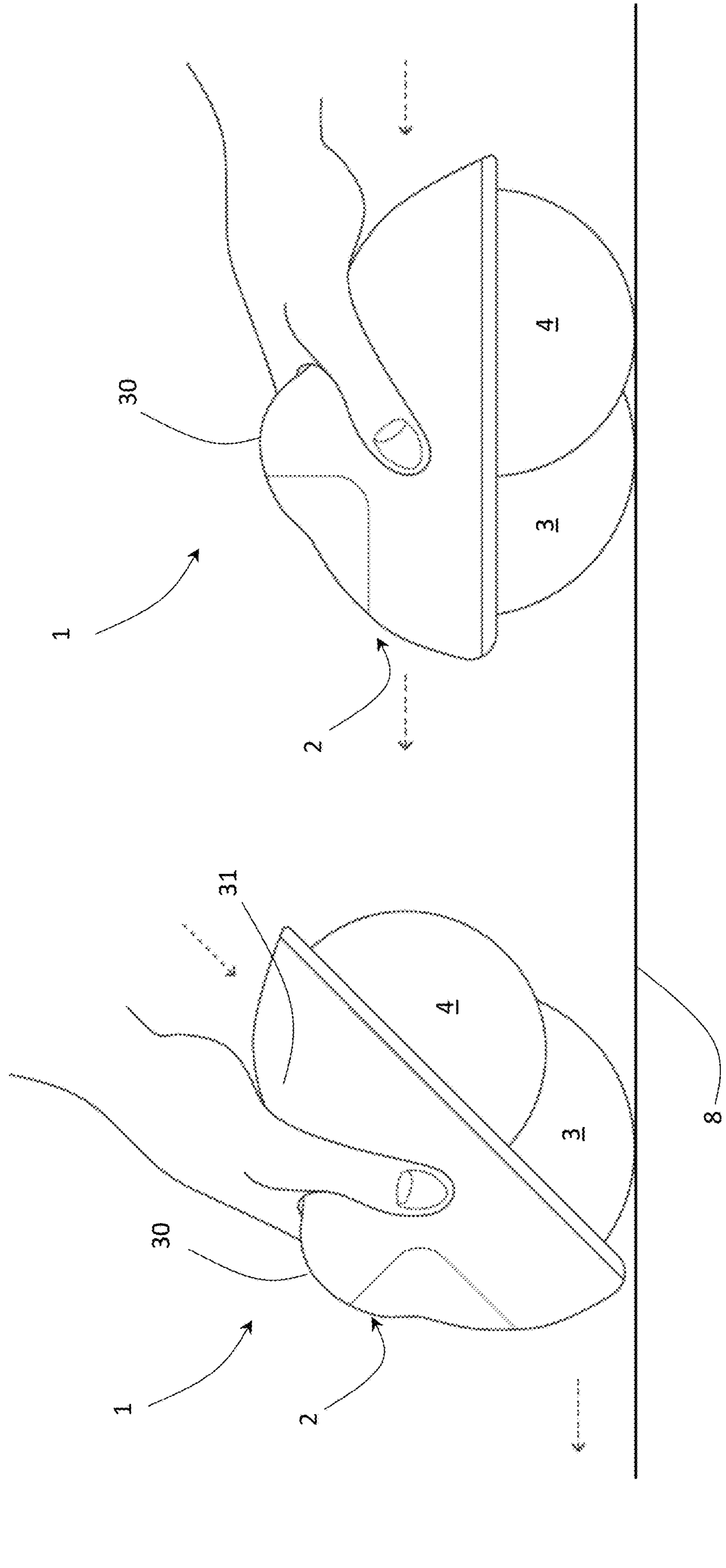
FIG. 8A illustrates a first tilted mode (pizza) of operation of the food slicer of FIG. 2.
FIG. 8B illustrates a second level mode (pancake) of operation of the food slicer of FIG. 2.
Figure 9B:
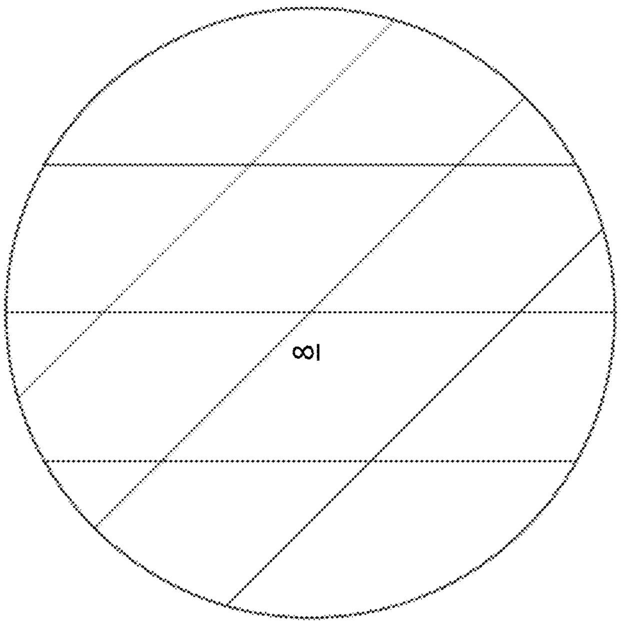
FIGS. 9A and 9B illustrate cutting patterns on a working surface of the food slicer of FIGS. 1 and 2.
Figure 9A:
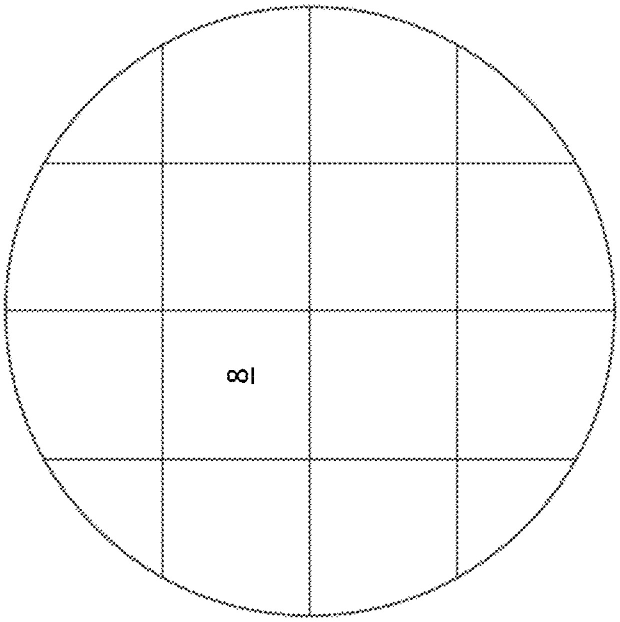
Figure 11:
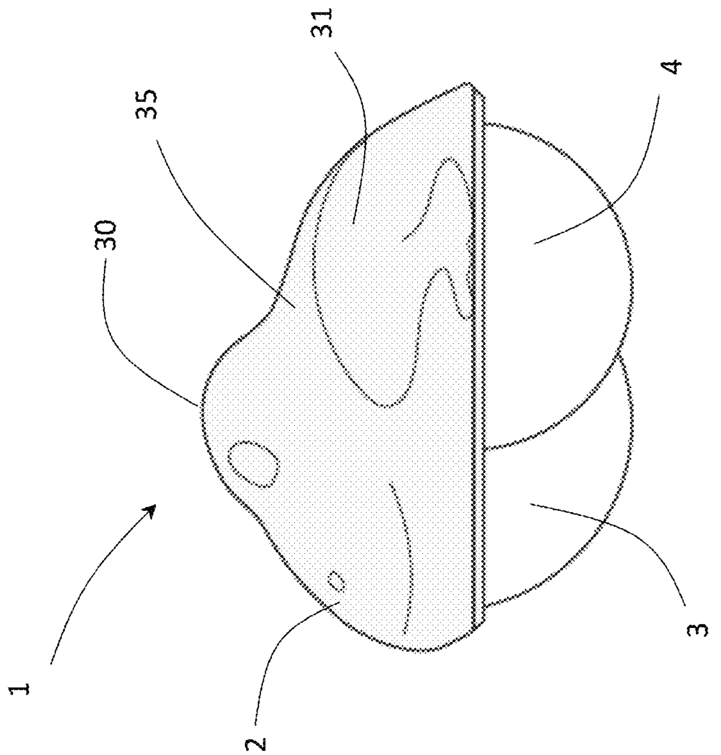
FIGS. 10 to 16 illustrate various outer designs for the housing of the food slicer of FIG. 2.

With the offset arrangement, the food slicer 1 may be able to stand on its own without falling over, and does not include a large handle, which falls into the work surface, and which takes up a lot of room during storage. Furthermore, the food slicer 1 may be used in two different orientations and for two different purposes. In the first "tilted" orientation (FIG. 8A), the housing 2 is tilted forward or backward, raising the second cutting blade 4 and the third cutting blade 5 off of the working surface, so that only the first cutting blade 3 contacts the working surface 8, e.g. food. Accordingly, the first cutting blade 3 may be used as a single cutter, e.g. for slicing pizza. In a second "level" orientation (FIG. 8B), the housing 2 is positioned so that all of the cutting blades are contacting the working surface 8, enabling the food slicer 1 to slice and dice the food, e.g. pancakes.

The first cutting blade 3 are rotatable about a first axis of rotation 11, and have a first diameter, e.g. at least 2 inches, preferably at least 3 inches and more preferably between 3 and 3.5 inches. The second cutting blade 3 and the third cutting blade 4 may be rotatable about a second axis of rotation 12 and third axis of rotation 13, respectively, and have a second diameter and a third diameter, respectively, e.g. at least 1.75 inches, preferably at least 2.25 inches and more preferably between 2.25 and 2.5 inches. The second diameter and the third diameter may be smaller than the first diameter, e.g. at least 0.25 inches smaller preferably 0.5 inches smaller, and more preferably between 0.5 and 1.0 inches smaller.

The first axis of rotation 11, the second axis of rotation 12, and the third axis of rotation 13, may be perpendicular to the longitudinal axis of the housing 2. The second axis of rotation 12 and the third axis of rotation 13 may be colinear or slightly offset along the longitudinal axis, i.e. but much less offset than from the first axis of rotation 11.

The first axis of rotation 11 may be vertically offset from the second axis of rotation 12 and the third axis of rotation 13, e.g. the first axis of rotation 11 is positioned higher in the housing 2 than the second axis of rotation 12 and the third axis of rotation 13. Ideally, the first axis of rotation 11 is positioned higher by half the difference between the first diameter and the second diameter, whereby the first cutting blade 3 and the second cutting blade 4 and the third cutting blade 5 all extend the same distance from the housing 2 when in the level position.

A first support structure 21 may be mounted in the housing 2, along or parallel to the longitudinal axis for supporting the first cutting blade 3. A second support structure 22 may be mounted in the housing 2, parallel to the longitudinal axis for supporting the second cutting blade 4. A third support structure 23 may be mounted in the housing 2, parallel to the longitudinal axis for supporting the third cutting blade 5. The first support structure 21, the second support structure 22 and the third support structure 23 may comprise longitudinally extending bars, which extend front to back in the housing 2; however, other support structures are within the scope of the invention, e.g. extending downwardly from the housing 2.

The first axis of rotation 11 may be defined by a first rivet 24 extending through the first support structure 21, the second axis of rotation 12 may be defined by a second rivet 25 extending through the second support structure 22, and the third axis of rotation 13 may be defined by a third rivet 26 extending through the third support structure 23, but other structures are within the scope of the invention. In particular, removable fasteners may be provided for easy removal and replacement of the first, second and third cutting blades 3, 4 and 5.

The positioning of the first, second and third support structures 21, 22 and 23 may provide the lateral offset as well as the vertical offset of the first, second and third cutting blades 3, 4 and 5, e.g. the first support structure 21 may be positioned vertically offset from the second support structure 22 and the third support structure 23. Alternatively, the position of the first, second and third rivets 24, 25 and 26 in the first, second and third support structures 21, 22 and 23, respectively, may provide the vertical offset.

Figure 1B:
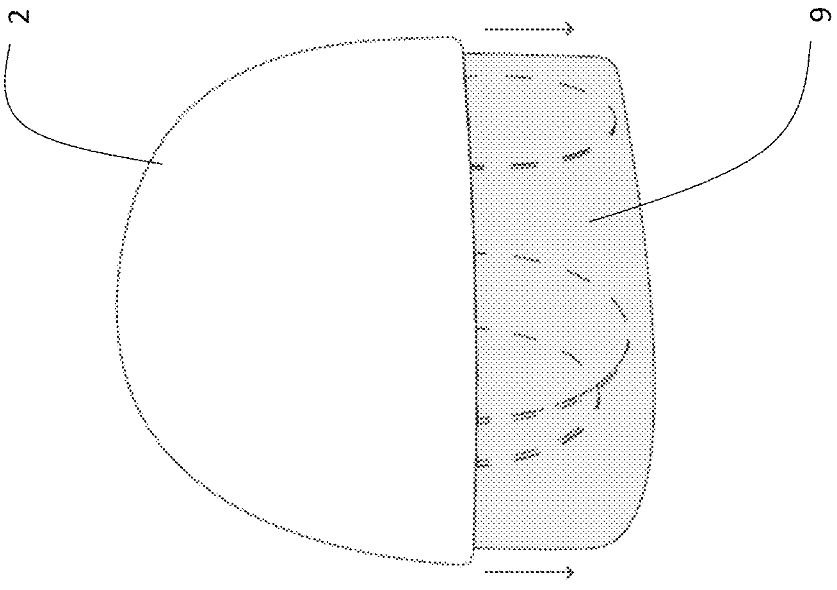
FIG. 1B illustrates an isometric view of the food slicer of FIG. 1A mounted in a lid.
Figure 2:
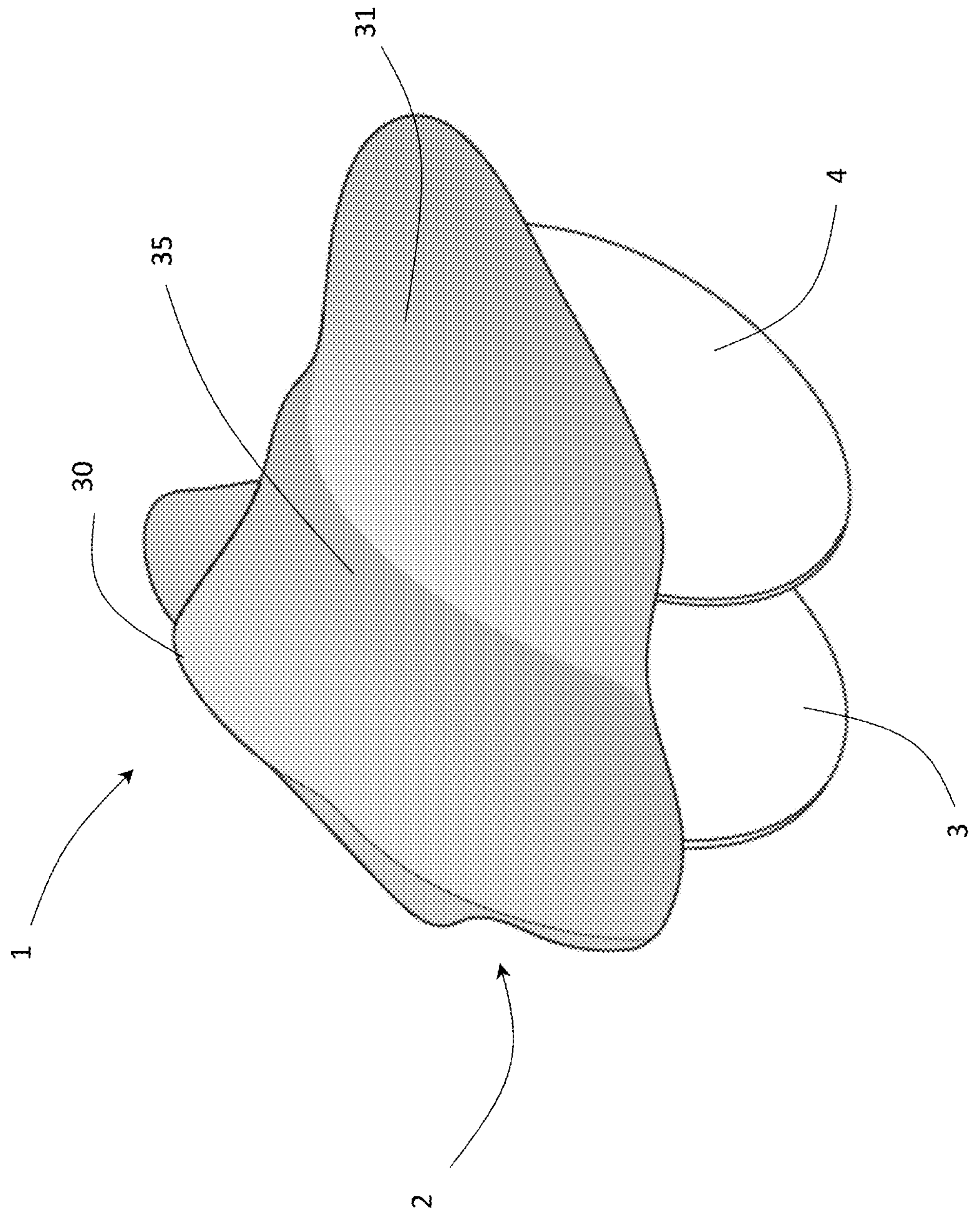
FIG. 2 illustrates an isometric view of an exemplary embodiment of a food slicer.
Figure 3:
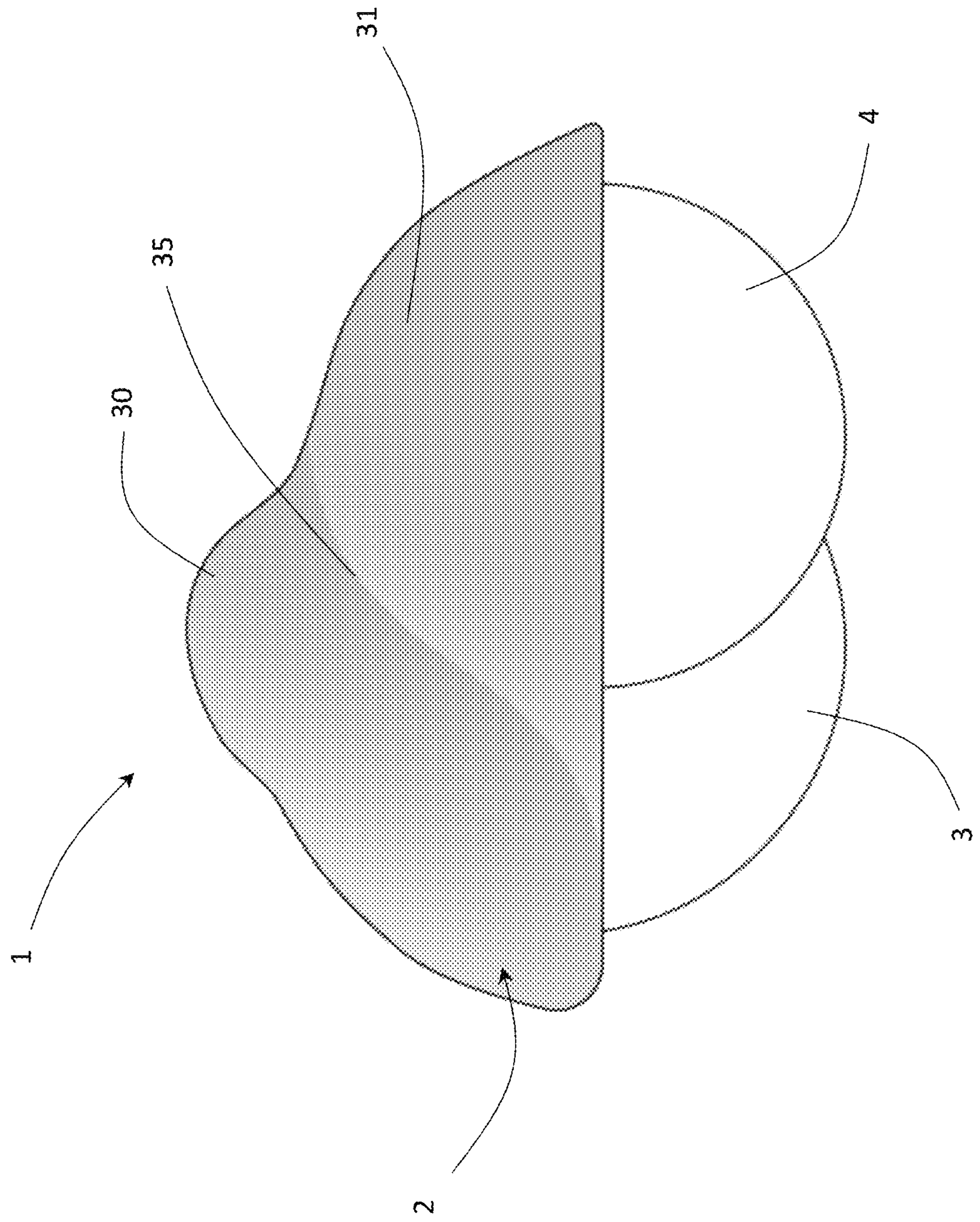
FIG. 3 illustrates a side view of the exemplary embodiment of FIG. 2.
Figure 4:
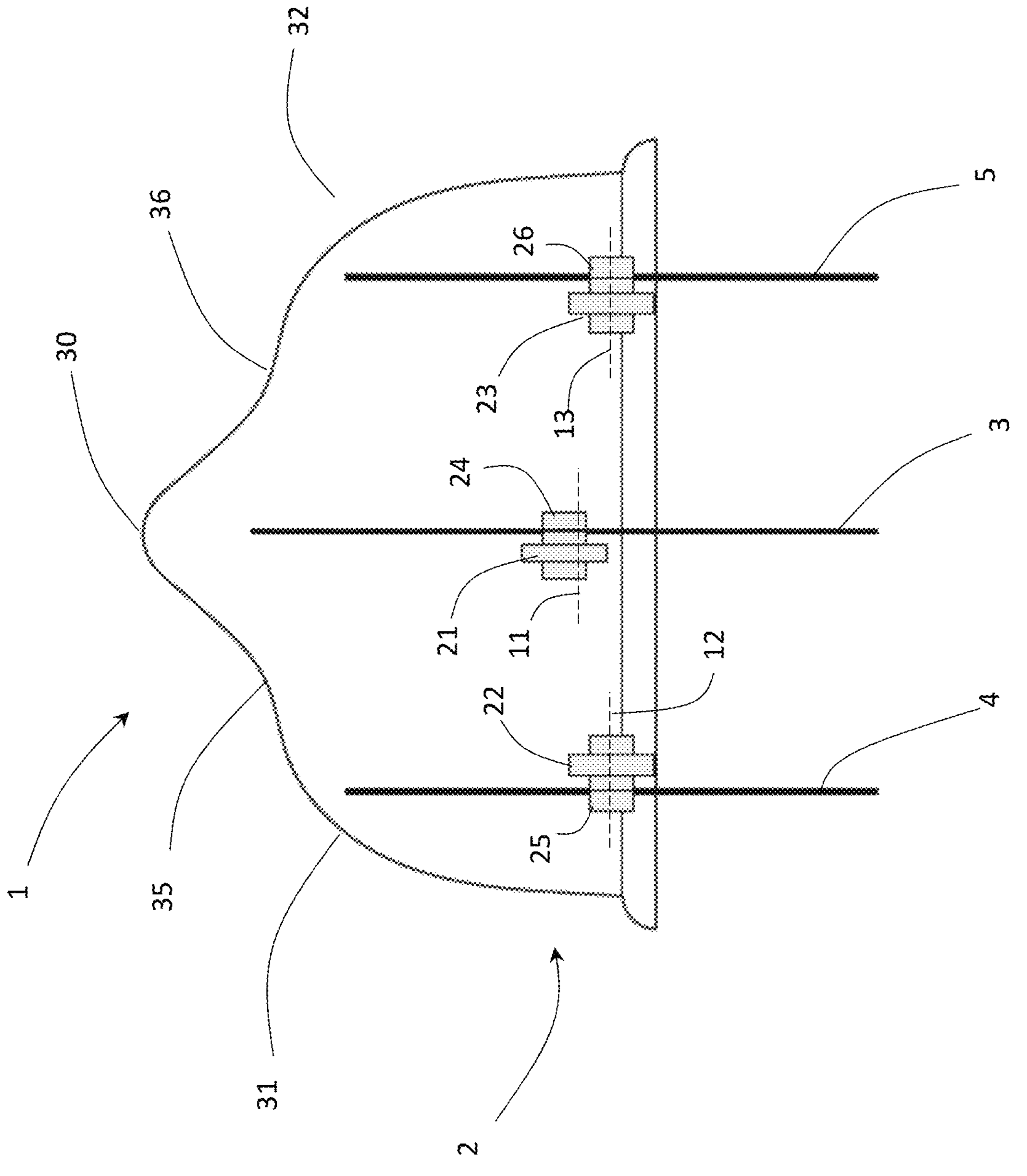
FIG. 4 illustrates a rear cross-sectional view of the food slicer of FIG. 2.
Figure 5:
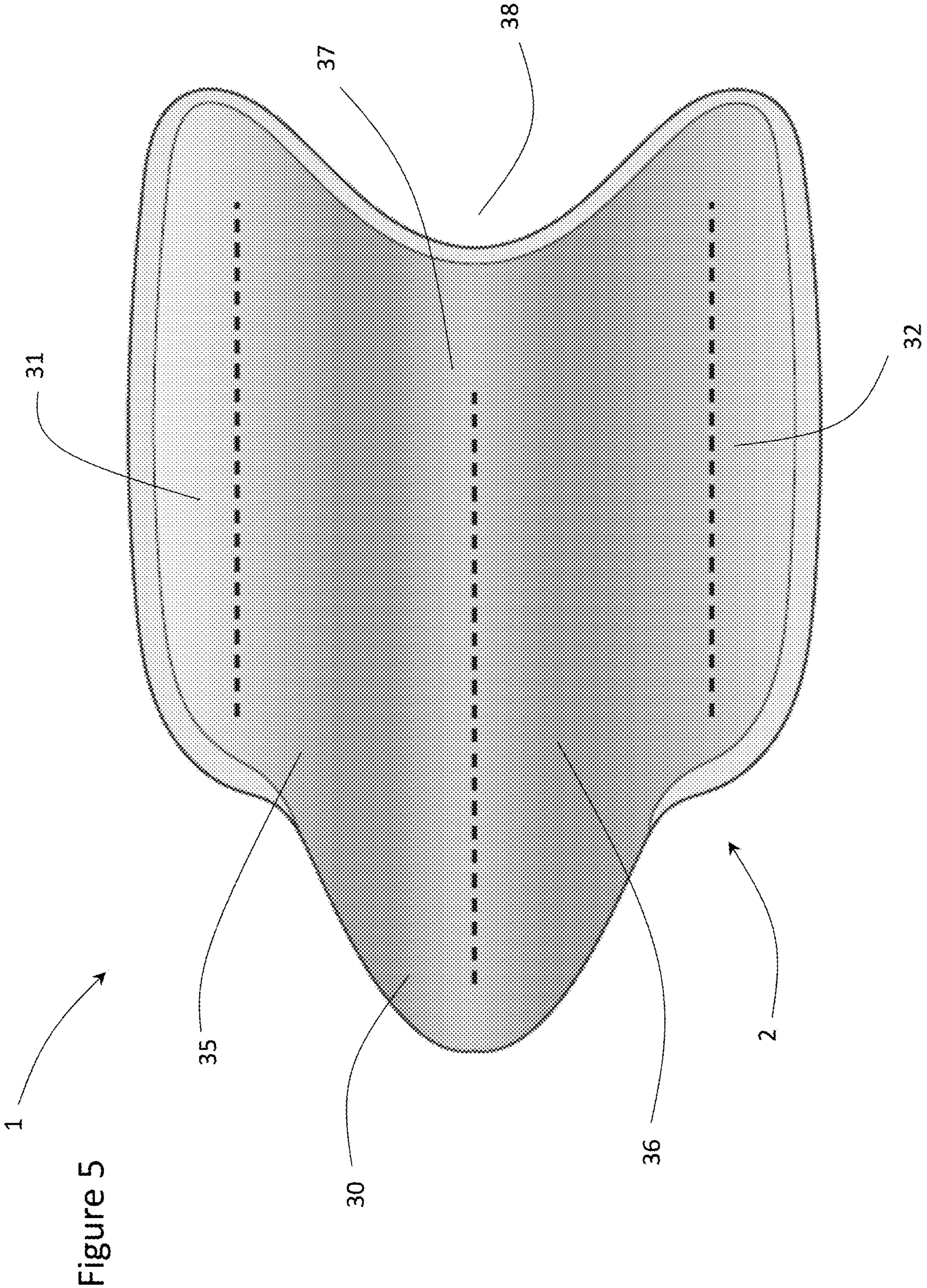
FIG. 5 illustrates a top view of the food slicer of FIG. 2.
Figure 6:
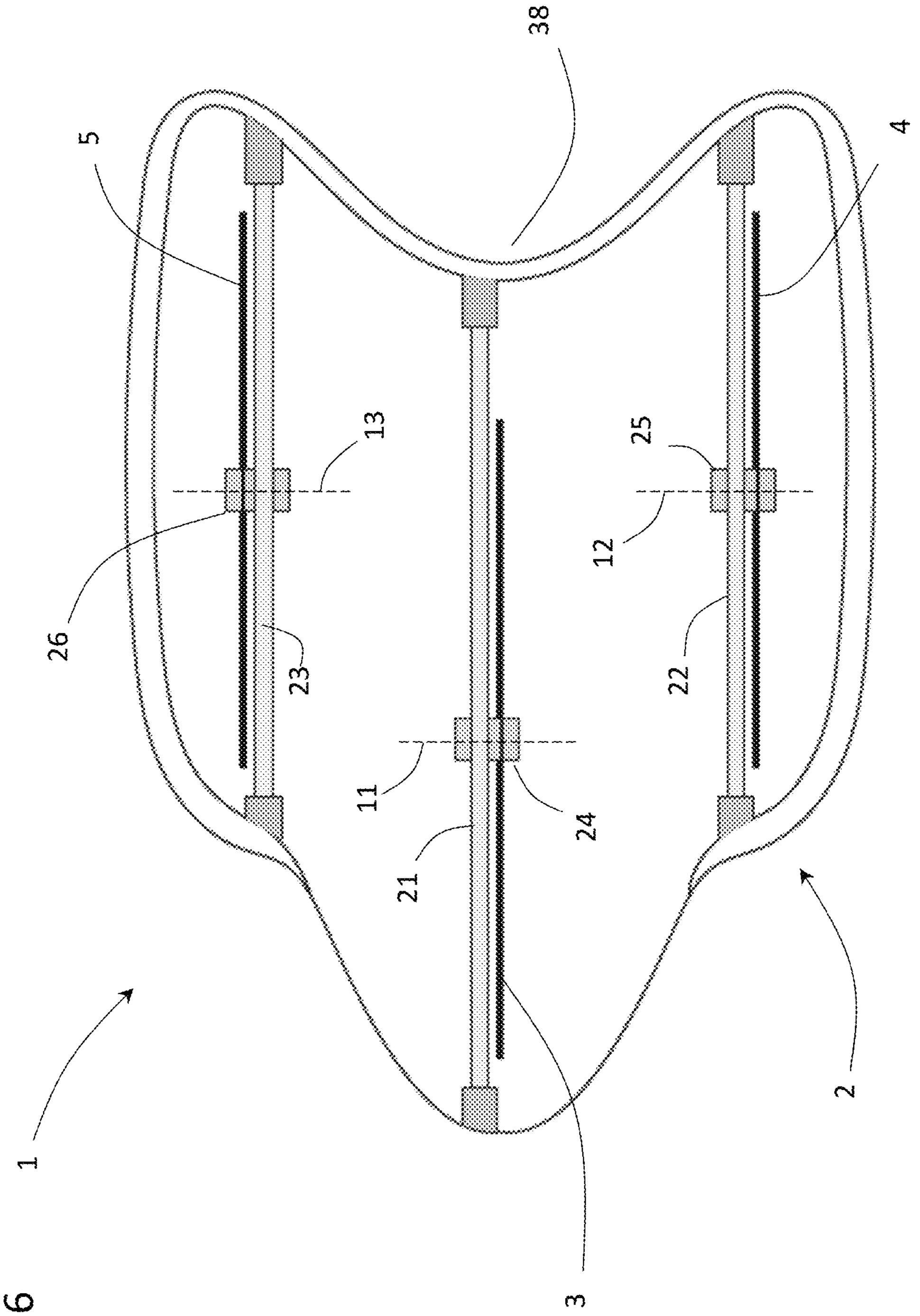
FIG. 6 illustrates a bottom view of the food slicer of FIG. 2.
Figure 7:
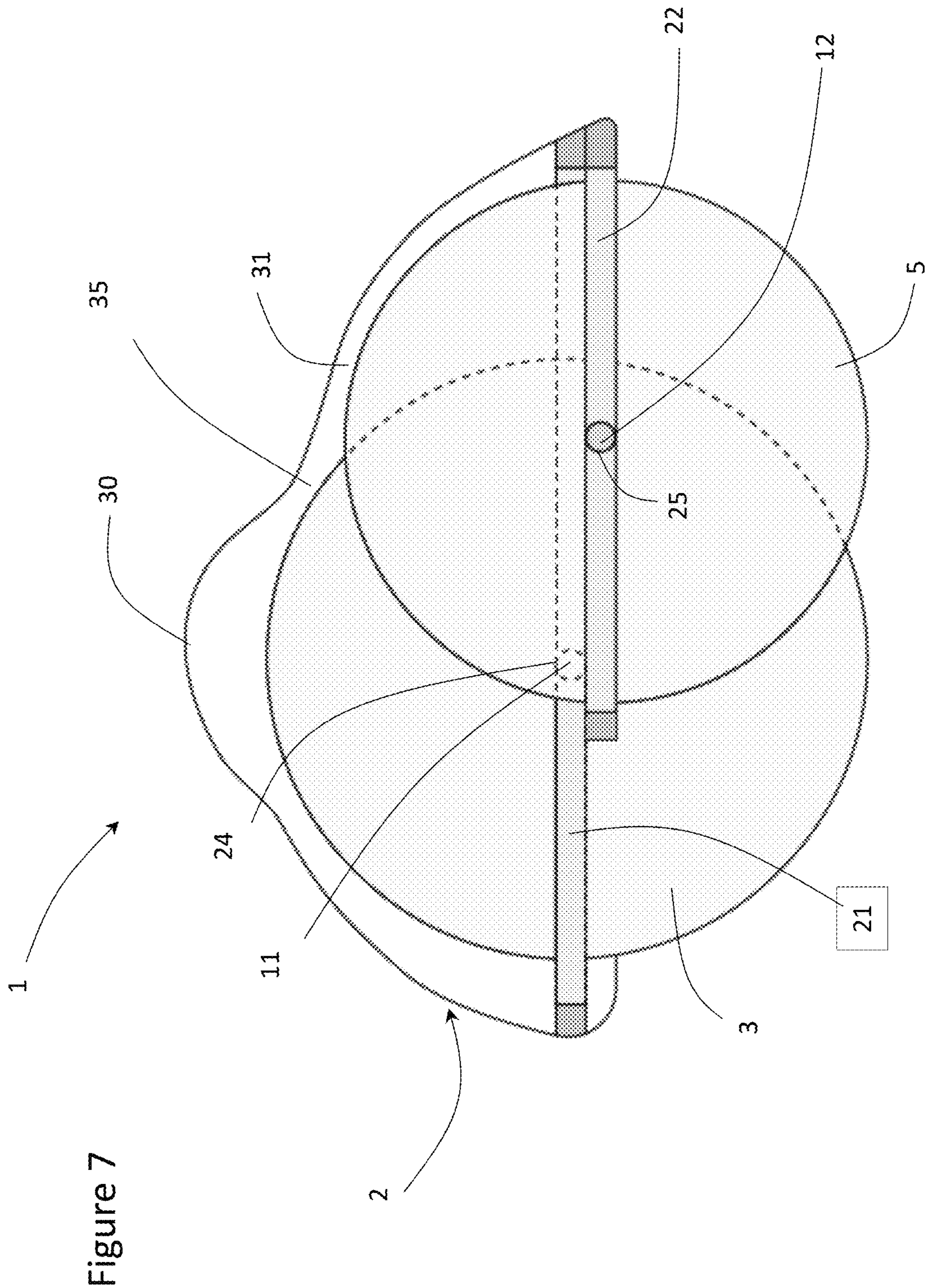
FIG. 7 illustrates a side cross-sectional view of the food slicer of FIG. 2.

An upper surface of the housing 2 may be configured into any suitable shape, such as rounded, e.g. an eggshell or a computer mouse, as in FIGS. 1A and 1B or contoured to include a central mound 30 covering the first cutting blade 3, a first side mound 31 covering the second cutting blade 4, and a second side mound 32 covering the third cutting blade 5, as in FIGS. 2-16. Like the first cutting blades 3, the central mound 30 is offset along the longitudinal axis 6 relative to the first side mound 31 and the second side mound 32. A first valley 35 may be provided between the central mound 30 and the first side mound 31, while a second valley 36 may be formed between the central mound 30 and the second side mound 32. A third valley 37 may be provided between the first side mound 31 and the second side mound 32 to the rear of the central mound 30. Part of the third valley 37 may include a U-shaped recess 38 provided in the rear of the housing 2 between the first side mound 31 and the second side mound 32. The first valley 35 and the second valley 36 may be configured to receive and support the fingers of a user during use, with the palm of the user's hand behind the central mound 30 in the third valley 36, whereby the user may easily grip and manipulate the food slicer 1 between the first and second orientations. Furthermore the first valley 35 and the second valley 36 provide an obvious position for the hand of the user, whereby the user is protected from the first, second and third cutting blades 3, 4 and 5 during use.

Figure 10:
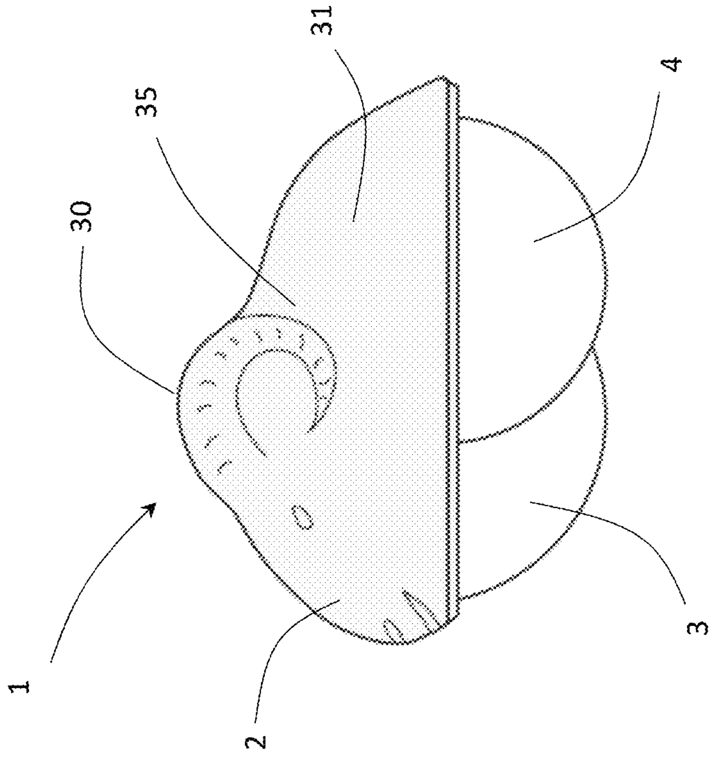
Figure 13:
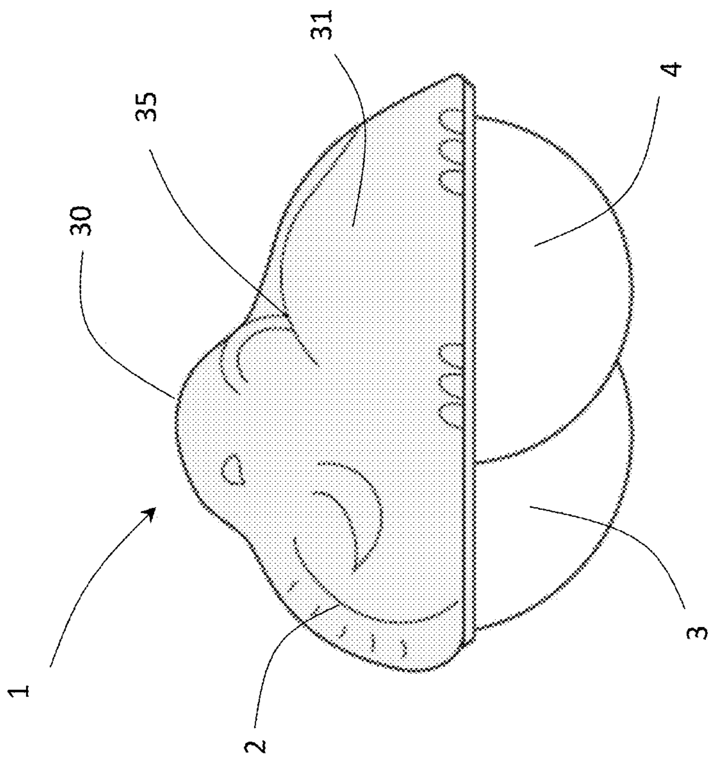
Figure 12:
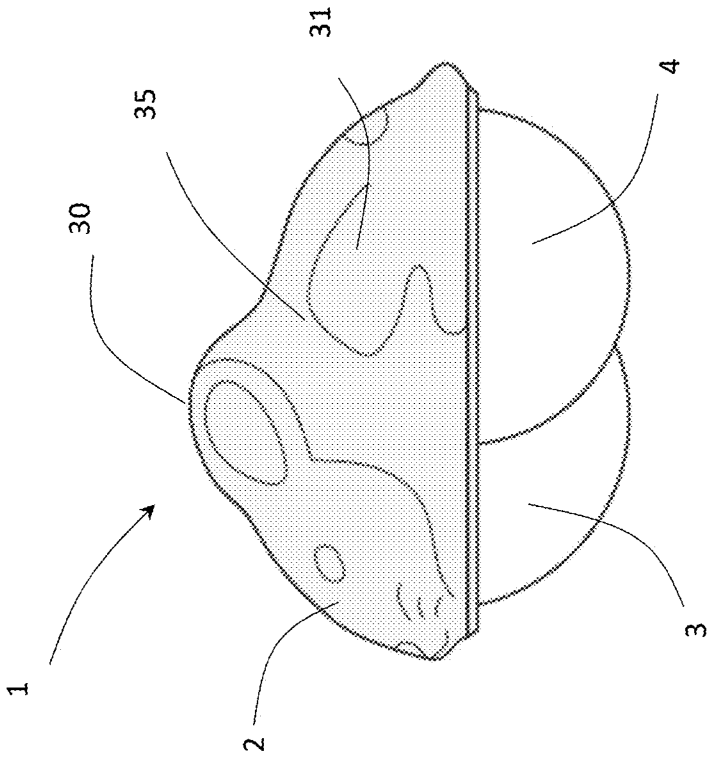
Figure 15:
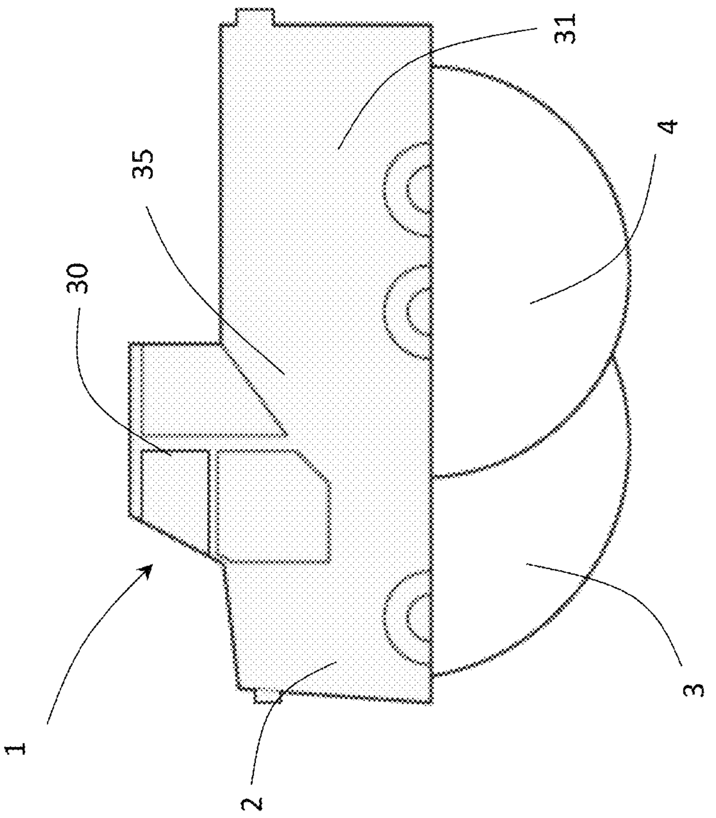
Figure 14:
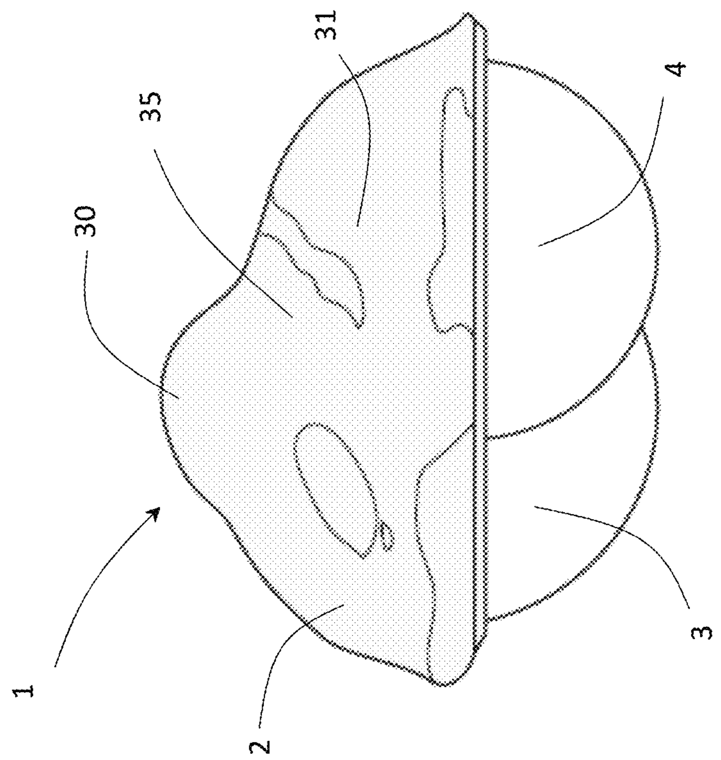
Figure 16:
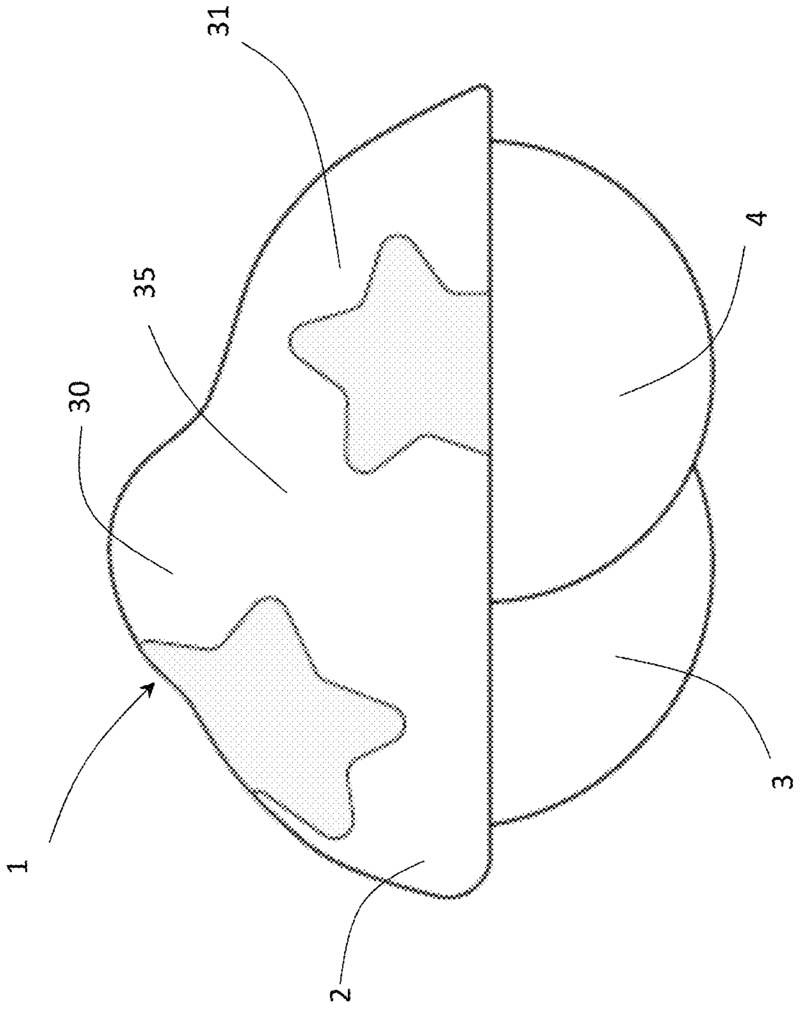

With reference to FIGS. 10-16, the upper surface of the housing 2 may also be decorated with one or more of color and embossing to make the housing 2 appear to be some animal, object or creature. In particular, the central mound 30 may be decorated to look like the head of an animal, while the first side mound 31 and the second side mound 32 may be decorated to look like the legs of an animal. For example: FIG. 10 has been decorated to look like a ram, FIG. 11 has been decorated to resemble a frog, FIG. 12 has been decorated to appear like a rabbit, FIG. 13 has been decorated to look like an elephant, FIG. 14 has been decorated to resemble a killer whale, and FIG. 15 has been decorated to appear like a fire truck. Alternative decorations are also possible, such as crests or emblems of various professional sporting teams (See FIG. 16).

Figure 17:
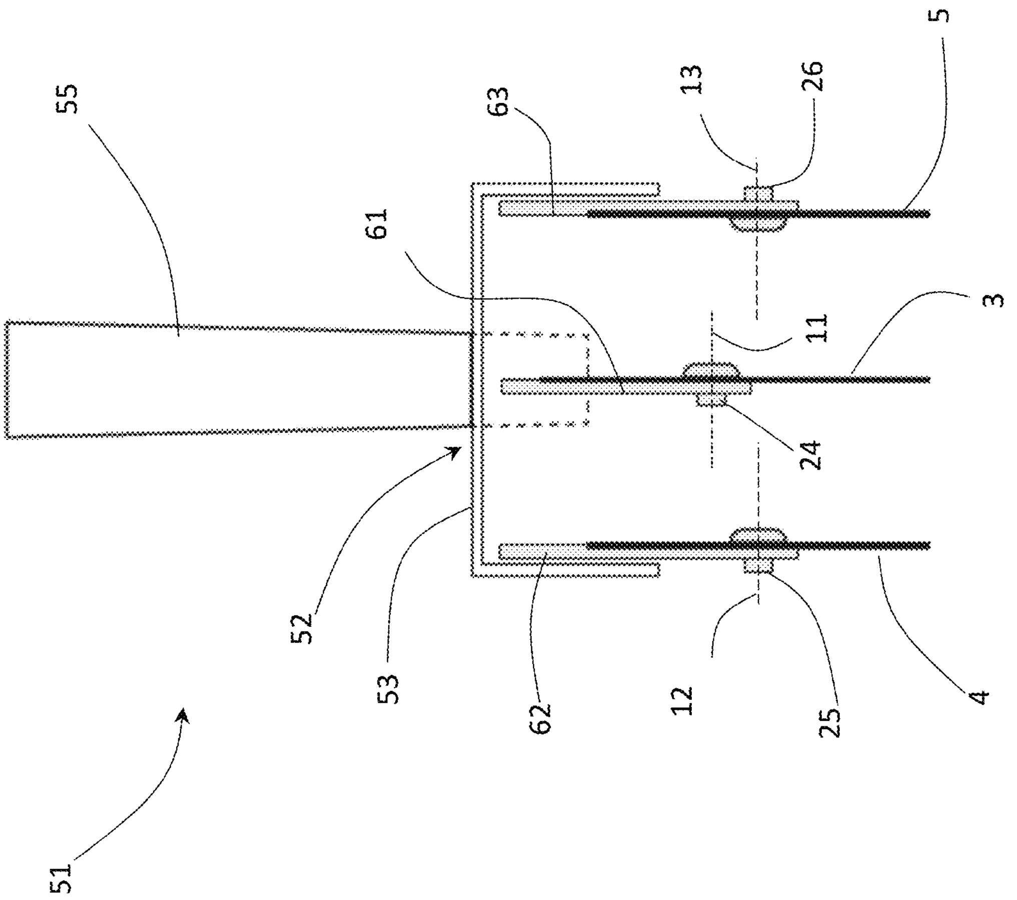
FIG. 17 illustrates a rear view of an exemplary embodiment of a food slicer with a handle.
Figure 18:
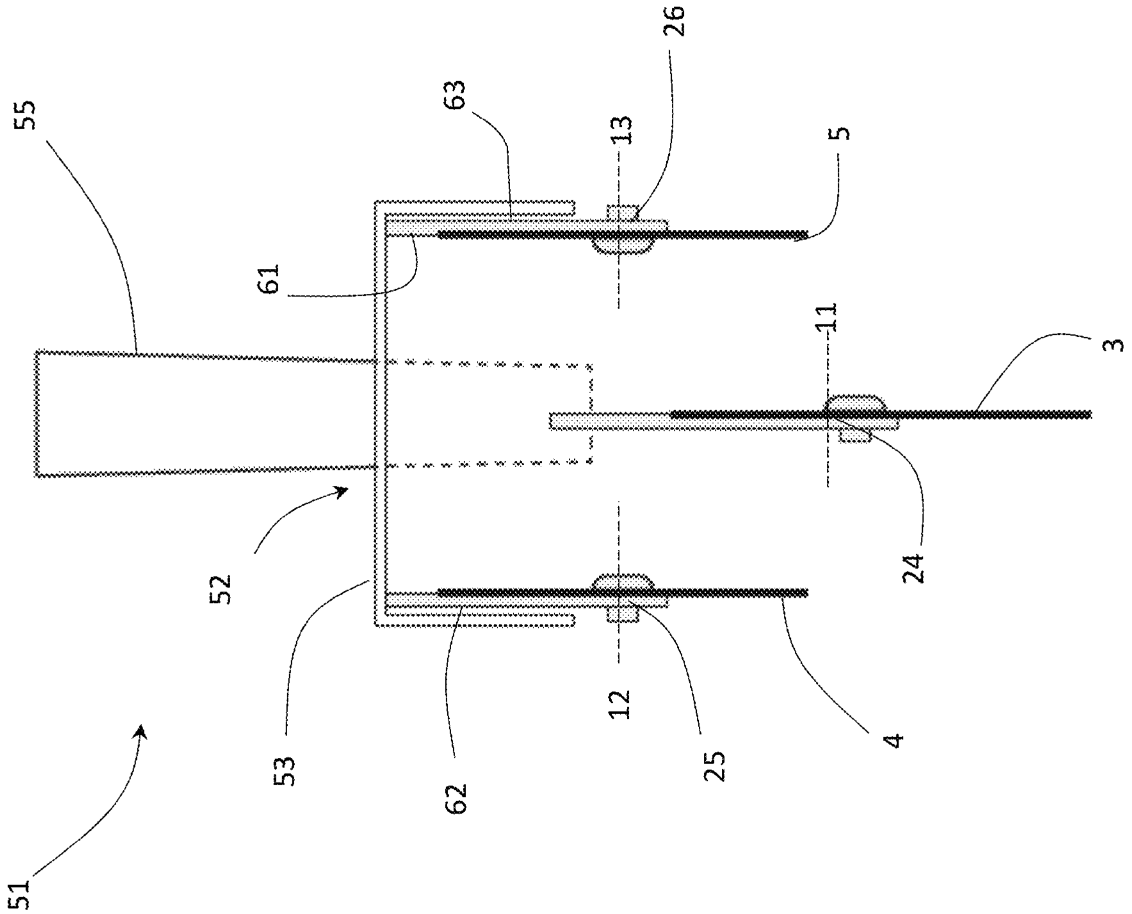
FIG. 18 illustrates a bottom view of the food slicer of FIG. 17.
Figure 19:
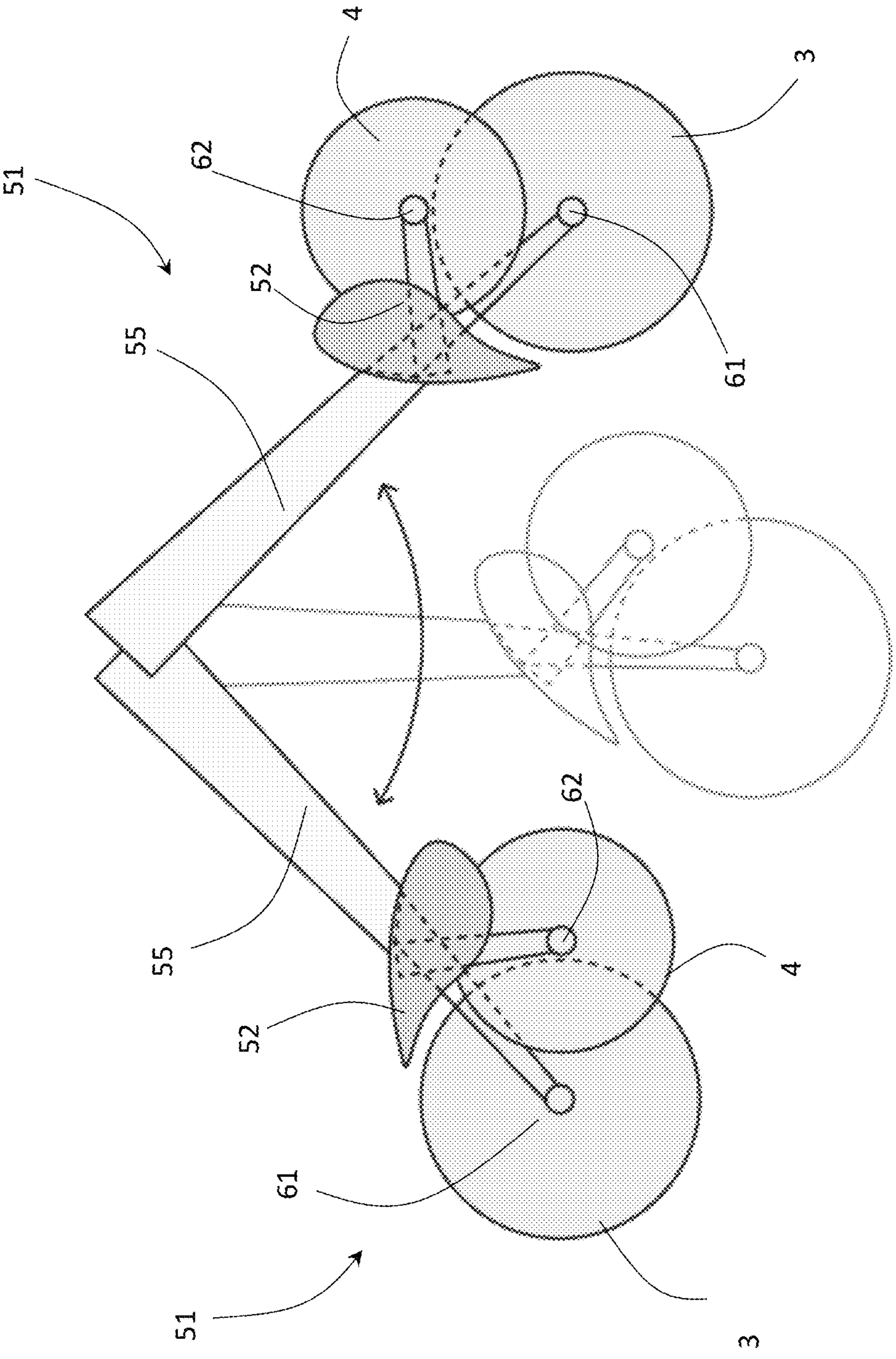
FIG. 19 illustrates the food slicer of FIG. 17 in the different alignments and modes of operation.

With reference to FIGS. 17-19, a food slicer 51 comprises the first cutting blade 3, the second cutting blade 4 and the third cutting blade 5, in the same or similar relative positions as the aforementioned food slicer 1. The food slicer 51, includes a housing 52 configured to cover a top portion of a plurality of round rotating cutting blades and includes a guard or shroud 53 therefore. The housing 52 may include a cylindrical or slightly tapered handle 55 extends upwardly from the housing 52 for manipulating the food slicer 51.

A first support structure 61 may be mounted in the housing 52, parallel to the longitudinal axis for supporting the first cutting blade 3. The first support structure 61 may extend colinear or parallel with the handle 55. A second support structure 62 may be mounted in the housing 52, parallel to the first support structure 61 and the longitudinal axis for supporting the second cutting blade 4. A third support structure 63 may be mounted in the housing 52, parallel the first and second support structures 61 and 62, and to the longitudinal axis for supporting the third cutting blade 5. The first support structure 61, the second support structure 62 and the third support structure 63 may comprise longitudinally extending bars, which extend downwardly from the housing 62; however, other support structures are within the scope of the invention. The second support structure 62 and the third support structure 63 may extend at an acute angle to the first support structure 61 (See FIG. 19)

As above, the first axis of rotation 11 may be defined by a first rivet 24 extending through the first support structure 61, the second axis of rotation 12 may be defined by a second rivet 25 extending through the second support structure 62, and the third axis of rotation 13 may be defined by a third rivet 26 extending through the third support structure 63, but other structures are within the scope of the invention.

With reference to FIG. 19, the cutter configuration is similar to that of the primary design, i.e. the food slicer 51 functions in two orientations and modes: e.g. a pancake slicer or pizza slicer (note: either mode may be used for slicing other foods besides pancakes and pizza, but for ease of description, the focus is on pancake or pizza slicing). With reference to the left side of FIG. 19, when all 3 cutting blades are down in contact with the work surface, the food slicer 51 may function as a pancake slicer, cutting three 1" parallel slices. By cutting one way across a 4" pancake for example, and then cross-cutting perpendicular to first cuts, the pancake will be quickly cut into 1" square bite-sized pieces for the consumer. By simply rotating the food slicer 51, e.g. by 90°, so that the second and third cutting blades 4 and 5 are pointing up, whereby the outer second and third cutting blades become out of contact with the working surface and non-functional, the larger first cutting blade 3 acts as a single-cutting wheel, similar to a standard pizza cutter. This could also be used to cut toast, bagels, or other breakfast foods in half.

We claim:

1. A food slicer comprising:

a housing configured to be gripped by a user, the housing having a longitudinal axis;

a first rotating blade rotatably extending from the housing about a first axis of rotation perpendicular to the longitudinal axis;

a second rotating blade rotatably extending from the housing about a second axis of rotation, wherein the second axis of rotation is perpendicular to the longitudinal axis and offset from the first axis of rotation;

wherein the second axis is offset more than one inch from the first axis of rotation along the longitudinal axis;

a third rotating blade rotatably extending from the housing about a third axis of rotation, wherein the third axis of rotation is perpendicular to the longitudinal axis and offset from the first axis of rotation.

2. The food slicer according to claim 1, wherein the housing is configured to rotate into a first tilted arrangement in which only the first rotating blade touches a work surface, and into a second level arrangement in which the first rotating blade, the second rotating blade and the third rotating blade touch the work surface.

3. The food slicer of claim 1, wherein the housing includes:

a first support extending parallel to the longitudinal axis configured to support the first rotating blade;

a second support extending parallel to the longitudinal axis configured to support the second rotating blade;

a third support extending parallel to the longitudinal axis configured to support the third rotating blade.

4. The food slicer of claim 1, wherein the contoured upper body is configured to look like an animal or creature, and wherein the second mound and the third mound are configured to look like legs of the animal or creature.

5. The food slicer of claim 1, wherein the contoured upper body is configured to look like an animal or creature.

6. The food slicer of claim 1, wherein the contoured upper body is configured to look like a vehicle.

7. The food slicer of claim 1, wherein the second axis of rotation is coterminous with the third axis of rotation.

8. The food slicer of claim 1, wherein the first rotating blade has a first diameter, and the second rotating blade has a second diameter smaller than the first diameter.

9. The food slicer of claim 8, wherein the first axis of rotation is vertically offset relative to the second axis of rotation and the third axis of rotation.

10. The food slicer of claim 1, wherein the housing includes a guard covering a top portion of the first rotating blade, and second rotating blade and the third rotating blade; and a handle extending from the guard.

11. The food slicer according to claim 10, wherein the housing is configured to rotate into a first tilted arrangement in which only the first rotating blade touches a work surface, and into a second level arrangement in which the first rotating blade, the second rotating blade and the third rotating blade touch the work surface.

12. The food slicer of claim 10, wherein the housing includes:

a first support extending downwardly from the housing colinear with the handle configured to support the first rotating blade;

a second support extending downwardly from the housing at an acute angle to the first support configured to support the second rotating blade;

a third support extending downwardly from the housing at an acute angle to the first support configured to support the third rotating blade.

13. The food slicer of claim 1, wherein one or more of the first cutting blade, second cutting blade and third cutting blade include a shaped cutting edge.

14. The food slicer of claim 13, wherein the shaped cutting edge comprise corrugated or zig-zag.

15. A food slicer comprising:

a housing configured to be gripped by a user, the housing having a longitudinal axis;

a first rotating blade rotatably extending from the housing about a first axis of rotation perpendicular to the longitudinal axis;

a second rotating blade rotatably extending from the housing about a second axis of rotation, wherein the second axis of rotation is perpendicular to the longitudinal axis and offset from the first axis of rotation;

a third rotating blade rotatably extending from the housing about a third axis of rotation, wherein the third axis of rotation is perpendicular to the longitudinal axis and offset from the first axis of rotation;

wherein the housing includes a contoured upper body configured to support a hand of the user;

wherein the contoured upper body includes:

a first mound covering the first rotating blade, a second mount covering the second rotating blade, and a third mound covering the third rotating blade; and a first valley between the first mound and the second mound configured for receiving fingers of a user, and a second valley between the first mound and the third mound configured for receiving fingers of the user.

16. The food slicer of claim 15, wherein the contoured upper body is configured to look like an animal or creature, and wherein the second mound and the third mound are configured to look like legs of the animal or creature.

17. A food slicer comprising:

a housing configured to be gripped by a user, the housing having a longitudinal axis;

a first rotating blade rotatably extending from the housing about a first axis of rotation perpendicular to the longitudinal axis;

a second rotating blade rotatably extending from the housing about a second axis of rotation, wherein the second axis of rotation is perpendicular to the longitudinal axis and offset from the first axis of rotation;

a third rotating blade rotatably extending from the housing about a third axis of rotation, wherein the third axis of rotation is perpendicular to the longitudinal axis and offset from the first axis of rotation;

wherein the housing includes a guard covering a top portion of the first rotating blade, and second rotating blade and the third rotating blade, and a handle extending from the guard;

wherein the housing includes:

a first support extending downwardly from the housing colinear with the handle configured to support the first rotating blade;

a second support extending downwardly from the housing at an acute angle to the first support configured to support the second rotating blade;

a third support extending downwardly from the housing at an acute angle to the first support configured to support the third rotating blade.

* * * * *